July 26, 1960

R. F. MOYER 2,946,611

MEANS FOR DETACHABLY SECURING HUBS TO SHAFTS

Filed Jan. 31, 1958

INVENTOR.
ROBERT F. MOYER
BY
*William Frederick Werner*

ATTORNEY

INVENTOR.
ROBERT F. MOYER
BY
*William Frederick Ikemer*
ATTORNEY

July 26, 1960 R. F. MOYER 2,946,611
MEANS FOR DETACHABLY SECURING HUBS TO SHAFTS
Filed Jan. 31, 1958 3 Sheets-Sheet 3

INVENTOR.
ROBERT F. MOYER
BY
William Frederick Werner
ATTORNEY

United States Patent Office 2,946,611
Patented July 26, 1960

2,946,611

MEANS FOR DETACHABLY SECURING HUBS TO SHAFTS

Robert F. Moyer, Warwick, R.I., assignor to Harsco Corporation, Harrisburg, Pa., a corporation of Delaware Filed Jan. 31, 1958, Ser. No. 712,385

3 Claims. (Cl. 287—52.06)

This invention relates to means for detachably securing hubs to shafts and more particularly to a means for replacing a broken shaft or broken keyway with a friction grip keyway.

One of the objects of the present invention is to provide a means for detachably securing hubs or gears, cams, wheels, etc., to a shaft.

Another object of the present invention is to provide a replacement shaft with friction grip keyway means.

Another object of the present invention is to provide a shaft of a substantially smaller diameter as a replacement for a larger diameter shaft without the loss of torque transmission but with the advantage of less material and therefore less weight in the replacement shaft.

And still another object of the present invention is to provide slippage in the driving connection between the shaft and hub of gears, cams, wheels, etc.

A further object of the present invention is to provide stock size, hardened and ground standard length replacement shafts for shafts of larger diameter and for replacement shafts unhardened and unground or for costly customed tailored replacement shafts.

Other objects of the present invention will become apparent in part and be pointed out in part in the following specification and claims.

In the past hardened and ground shafts were provided as original equipment in a new machine. The effective torque area of the shaft was twice the radius of a centerline from the center of the shaft to the base of the keyway slot. Thus the shaft carried excess metal and excess weight which added to the cost of the shaft and the cost for extra power to drive the excess weight.

In addition if the key broke it was a costly operation to disassemble the machinery to reach the broken key.

If the shaft broke it was either replaced with an unhardened and unground soft metal shaft which was provided with inherent spring, a detriment to bearing life, or it was replaced with a hardened and ground shaft which was customed tailored. A costly procedure.

Accordingly, it is an object of the present invention to eliminate the excess weight in a replacement shaft while eliminating the ineffective torque carrying area of the original shaft. The frictional engaging collar keyway substitute of the present invention will prevent shaft breakage when a metal object is accidentally dropped into a set of gears or other revolving machinery.

Referring to the drawings wherein like reference characters refer to like parts:

Figure 1:
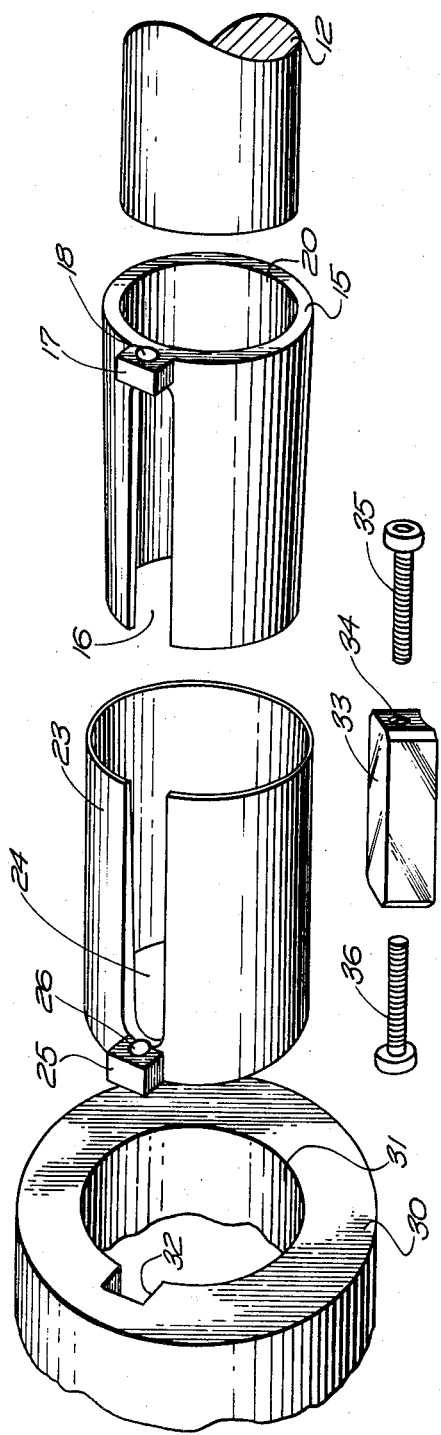
Figure 1 is an exploded perspective view of the new and improved means for detachably securing hubs to shafts.
Figure 3:
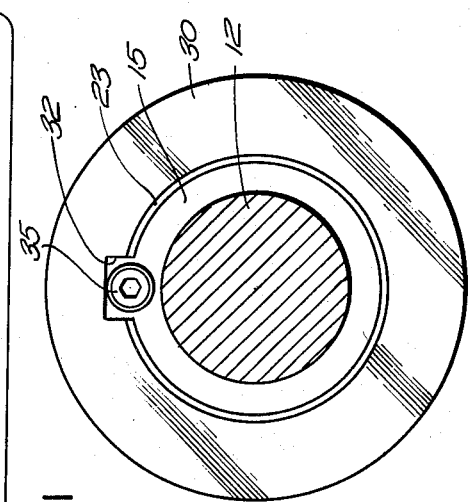
Figure 3 is an end elevational view of Figure 2.
Figure 2:
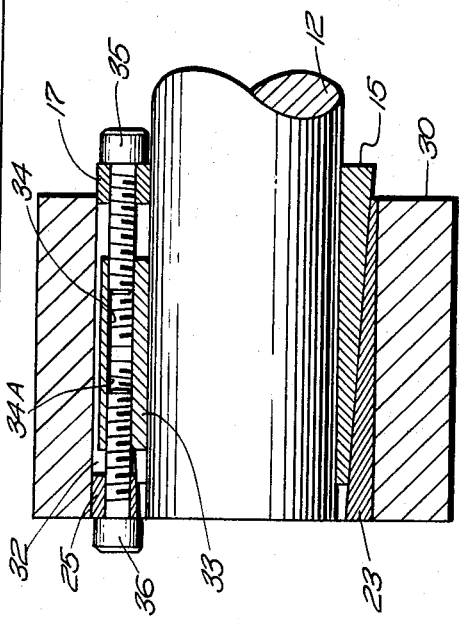
Figure 2 is a transverse cross sectional view through the assembled unit.
Figures 4, 5:
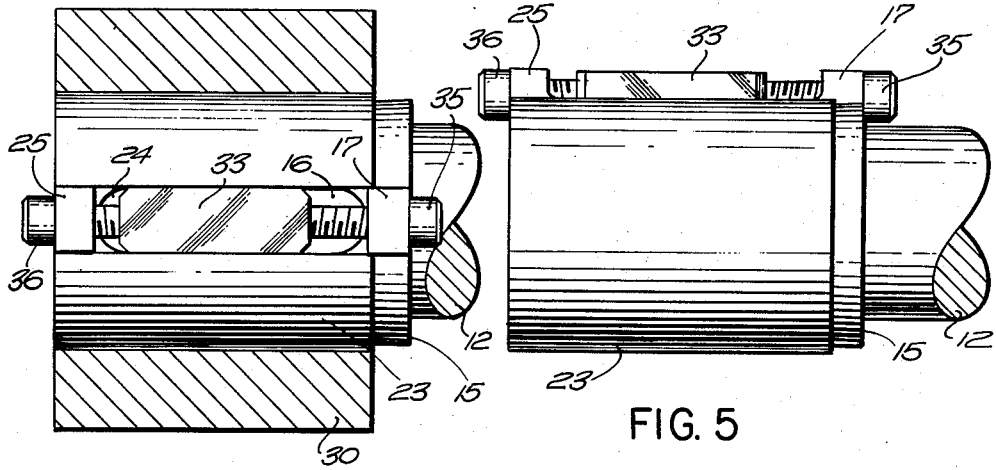
Figure 4 is a plan view of Figure 2 with the hub broken away.
Figure 5 is a side elevational view of Figure 2 with the hub eliminated for clarity.
Figure 6:
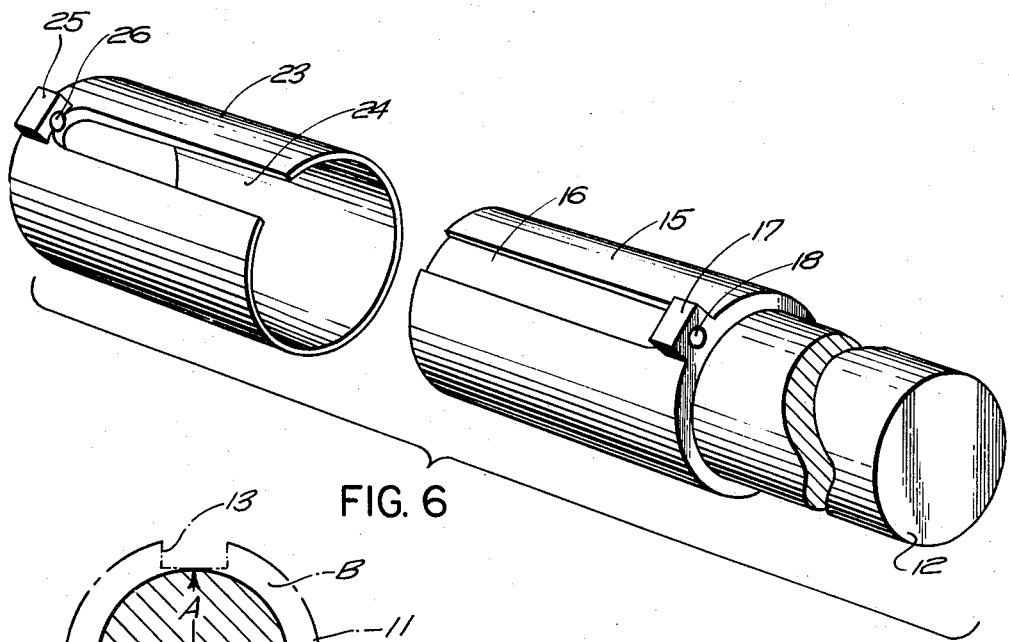
Figure 6 is an exploded perspective view of the partially assembled members of the new device with the hub eliminated.
Figure 7:
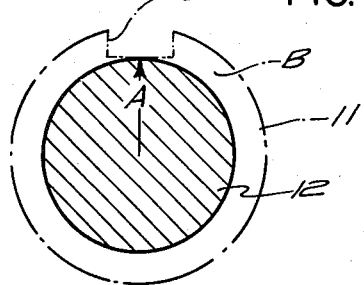
Figure 7 is a diagramatic view of the new shaft in full lines and the replaced shaft in dot and dash lines.
Figure 8:
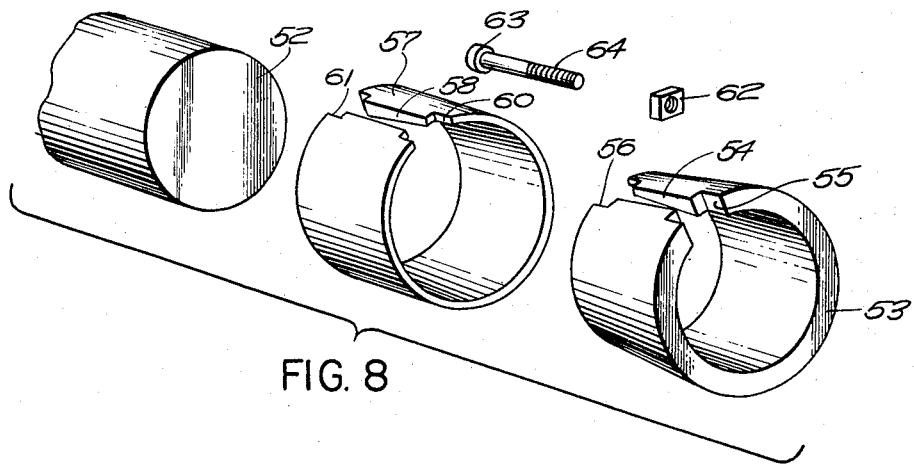
Figure 8 is an exploded perspective view of modified construction.

Referring to Figure 7 wherein is illustrated in dot and dash lines a shaft 11 as originally provided in a new machine and a shaft 12 illustrated in full lines made in accordance with the present invention. It will be noted that radius A of shaft 12 is tangent to the base of the keyway 13 in shaft 11. It is known as a matter of general knowledge that the area B of metal between the outside diameter of shaft 12 and the outside diameter of shaft 11 is ineffective in carrying the torque of shaft 11. Thus, the effective torque area of shaft 11 is shaft 12. This is so because the keyway 13 has destroyed the effective torque area of area B.

The weight of the metal in area B is equal to 44 percent of the weight of shaft 11. Or to rephrase it, it would take 80 percent more weight of shaft 12 to provide shaft 11 as illustrated. This added 80 percent in area and weight does not increase the torque transmitting capabilities of shaft 11.

Accordingly, shaft 12 possesses the same torque transmitting ability as does shaft 11 with an 80 percent saving in area and weight.

Referring to Figures 1, 2, 3, 4, 5 and 6, a tapered collar 15 is provided with a slot 16, a square key projection 17 and an orifice 18. The taper of collar 15 is such that the large side of the taper 20 is located in the square key projection 17 end of collar 15 with said taper providing a sliding fit over shaft 12.

A companion tapered collar 23 is provided with a slot 24, a square key projections 25 having an orifice 26. The large area of the taper of companion collar 23 is located in the square key projection 25 end.

Hub 30 provided with a bore 31 having a keyway 32 is illustrative of a cam, gear, wheel or any other instrumentality which may be secured to a shaft.

A key 33 is provided with oppositely disposed axially located screw threads 34, 34A. Two screws 35 and 36 one left hand and one right hand are adapted to be operatively located in screw threads 34, 34A.

In operation, and by way of example and not limitation, a one and one-half inch diameter shaft 12 is to be used as a replacement for two inch diameter shaft 11. Shaft 12 is a hardened and ground mass produced stock item. Collar 15 is slid over shaft 12 and placed in desired position. Companion collar 23 is slid over collar 15 with slots 16, 24 and square key projections 17, 25 in alignment. Key 33 is placed in slots 16, 24. Screw 35 is passed through orifice 18 and is loosely threaded in screw thread 34. Screw 36 is passed through orifice 26 and is loosely threaded into screw threads 34. Tightening screws 35, 36 in threads 34 draws companion collar 23 over collar 15. Thereby forcing the companion tapers of collars 15, 23 to wedge tightly together. Thus forcing collar 15 to grip shaft 12. The degree of force exercised by screws 35, 36 in wedging collars 15, 23 together determines whether collar 15 grips shaft 12 in a vise tight grip or in a grip which would permit shaft 12 to revolvingly slip in collar 15 when a predetermined force is applied to shaft 12.

The assembled unit of shaft 12, collars 15, 23, key 33 and screws 35, 36 is slid into bore 31 with square key projections 17, 25, and key 33 engaging keyway 32 of hub 30.

Thus it will be seen that a shaft of a smaller diameter may replace a shaft of a larger diameter. The keyway is eliminated in the shaft. Thereby preventing an area of weakness or useless torque conveying area in the smaller shaft. A pair of companion tapered collars serving as a drive means are provided with or without a slippage privilege between shaft and hub.

Screws 35 and 36 co-operating with key 33 serve a second function besides drawing collars 15 and 23 together. By unscrewing either screw 35 or 36 and tapping the head of the loosened screw, collars 15, 23 are driven apart or separated. This function is an important attribute of the instant construction.

There is a modified form of separation in the construction of providing screw threads in orifice 26 so that screw 36 is threaded in both orifice 26 and threads 34A. The unscrewing of screw 36 will cause tapered collars 15 and 23 to separate. In place of screw threads in orifice 26 a screw nut may be placed on screw 36 between square key projection 25 and key 33. The unscrewing of screw 36 will cause tapered collars 15 and 23 to separate. In these structures screw 35 provides the medium of final tightness between collars 15 and 23.

In the modified form shown in Figures 8, 9, 10 and 11 an adjustable shaft bushing is provided for mountable machine elements such as ball bearings, pulleys and the like, in which a machine element is mounted upon a straight shaft in a fixed position by means of said adjustable bushing. The machine elements are provided with a straight cylindrical hub and a straight cylindrical bore in said hub. The diameter of the straight hub bore being greater than the diameter of said shaft, for the purpose of the insertion of said adjustable bushing which eliminates the key and keyway drive.

Adjustable shaft bushings of the present invention include a pair of opposed tapered collars axially adjustable and built on a double wedge principle, longitudinally split and recessed to receive a wedging means such as a draw nut and bolt. Thus providing a clamping means for pulling together the pair of opposed tapered collars and thereby simultaneously tighten the shaft and bore of the hub of a machine element. Upon tightening the nut and bolt, the opposed tapered collars will simultaneously expand and contract respectively in such a manner that the inner collar will contract and the outer collar will expand to tighten the shaft to the hub.

Ball bearing 50 is provided with a cylindrical hub 51 having a straight bore therein. A straight shaft 52 is provided for the mounting of hub 51.

The adjustable shaft bushing consists of a tapered inner collar 53 longitudinally split or slotted as at 54. Split or slot 54 is provided with recessed opposite ends 55 and 56.

And a tapered outer collar 57 longitudinally split or slotted as at 58. Split or slot 58 is provided with recessed opposite ends 60, 61. A nut 62 and a bolt consisting of a head 63 and a threaded portion 64 are provided as a tightening means.

Figure 9:
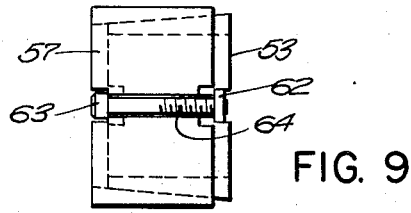
Figure 9 is a plan view of Figure 8 assembled.
Figure 10:
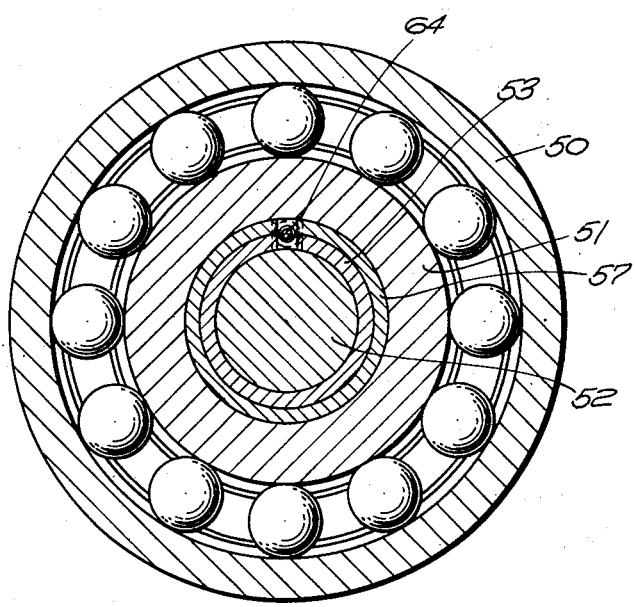
Figure 10 is an end elevational view of one application of the modified construction shown in Figures 8 and 9.
Figure 11:
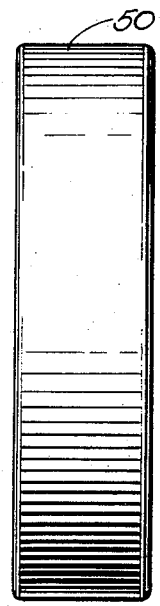
Figure 11 is a side elevational view of Figure 10.

Referring to Figure 9, tapered outer collar 57 is slid over tapered inner collar 53 with split 58 in alignment with split 54. Head 63 abuts and is housed in recess 61 with recess 56 assuring clearance and freedom of longitudinal movement for head 63. Threaded portion 64 is housed in splits 58, 54. Nut 62 abuts and is housed in recess 55 with recess 60 assuring clearance and freedom of longitudinal movement for nut 62. It becomes self evident that the engagement of threaded portion 64 with nut 62 will force tapered outer collar 57 in wedging engagement with tapered inner collar 53.

Having shown and described preferred embodiments of the present invention, by way of example, but realizing that structural changes could be made and other examples given without departing from either the spirit or scope of this invention, what I claim is:

1. In a means for detachably securing a hub to a shaft, the combination therewith of a hub having a bore, a keyway provided in said hub at the periphery of said bore, a shaft, a first tapered collar provided with a longitudinal slot, a second tapered collar provided with a second longitudinal slot, said first tapered collar selectively positioned on said shaft, said second tapered collar positioned over said first tapered collar in wedging relationship, a key provided with means to pull said first tapered collar into wedging relationship with said second tapered collar to force said first mentioned tapered collar into predetermined gripping relationship with said shaft, said key engaging said first and second tapered collars and said keyway to unite said shaft with said hub.

2. In a means for detachably securing a hub to a shaft, the combination therewith of a shaft, a tapered collar having a square key projection provided with an orifice, a slot in said collar, said collar being selectively positioned on said shaft, a companion tapered collar having a second square key projection provided with a second orifice, and a second slot in said companion tapered collar, said companion tapered collar being positioned over said first mentioned collar with said slots of both collars and said first mentioned and second square key projections in alignment, a key, provided axially with a screw thread throughout its length, located in said slots, two screws, one screw passing through the orifice in said first mentioned square key projection and engaging said screw thread, the second screw passing through said second orifice and engaging said screw thread, the degree of insertion of said two screws in said screw threads determining the force with which said first collar engages said shaft through the taper of said companion collar, a hub provided with a bore and a keyway, said key and said first mentioned and second square key projection located in said bore and engaging said keyway to detachably secure said shaft and said first mentioned and companion tapered collar to said hub.

3. In a means for detachably securing a hub to a shaft, the combination therewith of a hub having a bore, provided with a keyway, a shaft in said bore in concentric radially spaced relation thereto, a two part adjustable bushing operatively interposed between said shaft and said bore for frictionally mounting with a predetermined amount of slippage said hub upon said shaft, said two part adjustable bushing including a tapered inner collar and a tapered outer collar, said collars being slotted axially a major portion of their length, and having complementary mating surfaces, and means for frictionally engaging said tapered inner collar and said tapered outer collar together to thereby tighten said inner collar against the shaft, a projection on one end of said inner collar and provided with an axial orifice a projection on said outer collar provided with an axial orifice, a key positioned in said slots and provided axially with a screw thread, a first screw means passing through said first mentioned axial orifice and engaging the screw thread in said key to draw said first mentioned projection toward said key, a second screw means passing through said second mentioned axial orifice and engaging the screw thread in said key to draw said second mentioned projection toward said key, to provide the means for frictionally engaging said collars together, said key and said projections engaging said keyway in said hub to provide a drive means between said hub and said inner and outer tapered collars.

References Cited in the file of this patent

UNITED STATES PATENTS

| | | |
|---|---|---|
| 62,081 | Smith | Feb. 12, 1867 |
| 174,177 | Albrecht | Feb. 29, 1876 |
| 333,376 | Yocom | Dec. 29, 1885 |
| 2,475,042 | McCloskey | July 5, 1949 |
| 2,691,541 | Benedek | Oct. 12, 1954 |